United States Patent [19]

Koyanagi et al.

[11] 4,180,634

[45] Dec. 25, 1979

[54] POLYMERIZING VINYL CHLORIDE WITH LOWERING OF SCALE FORMATION

[75] Inventors: Shunichi Koyanagi; Toshihide Shimizu, both of Ibaragi; Kenji Fushimi, Tokyo, all of Japan

[73] Assignee: Shin-Etsu Chemical Co., Ltd., Tokyo, Japan

[21] Appl. No.: 888,166

[22] Filed: Mar. 20, 1978

Related U.S. Application Data

[63] Continuation-in-part of Ser. No. 705,021, Jul. 14, 1976, abandoned.

[30] Foreign Application Priority Data

Jul. 18, 1975 [JP] Japan ................................ 50/87975

[51] Int. Cl.$^2$ .................... C08F 2/18; C08F 18/08; C08F 14/06
[52] U.S. Cl. ................................ 526/62; 526/74; 526/202; 526/218; 526/238
[58] Field of Search .................. 526/62, 74, 221, 237, 526/238, 202

[56] References Cited

U.S. PATENT DOCUMENTS 3,467,636  9/1969  Nersasian .................... 526/255 X

FOREIGN PATENT DOCUMENTS 902083  7/1962  United Kingdom .................... 526/238

*Primary Examiner*—C. A. Henderson
*Attorney, Agent, or Firm*—Bierman & Bierman

[57] ABSTRACT

A method for polymerizing vinyl chloride in an aqueous suspension wherein polymer scale is prevented from depositing on walls and other surfaces in contact with monomer in a polymerization reactor. According to the method, one or more compounds selected from iodine salts of alkali metals and alkaline earth metals are added to the polymerization mixture. The effect of this method can be enhanced synergistically by coating a polar organic compound or an organic dye over the surfaces in contact with the monomer.

9 Claims, No Drawings

POLYMERIZING VINYL CHLORIDE WITH LOWERING OF SCALE FORMATION

This is a continuation-in-part application of Ser. No. 705,021, filed July 14th, 1976 now abandoned and which claims the priority of Japanese patent application No. 50-87975, filed July 18, 1975.

BACKGROUND OF THE INVENTION

This invention relates to a method for the suspension polymerization of vinyl chloride or a monomer mixture having vinyl chloride as the main component with one or more copolymerizable monomers, in which polymer scale is prevented from depositing on the walls and other surfaces in contact with the monomer or monomers in a polymerization reactor.

In the preparation of polyvinyl chloride resins, various methods including suspension polymerization, emulsion polymerization, solution polymerization, gas-phase polymerization and bulk polymerization are known. However, none of these prior art methods has been free from the problem of polymer scale deposition. According to the prior art methods, the surfaces in contact with monomer, including the inner walls of the reactor, and surfaces of the agitator in the reactor usually become covered with polymer scale during the polymerization runs, resulting in decreasing polymer yields and the lowering of the cooling capacity of the reactor. Further, pieces of the polymer scale so deposited eventually come off the surfaces and enter into the resulting polymer product thereby degrading its quality. Furthermore, the cleaning of the polymerization reactor to remove the polymer scale after each polymerization run not only requires extensive labor and time but also involves a serious health problem for workers due to the toxicity of the unreacted monomer absorbed in the polymer scale.

According to another prior art method, prevention of polymer scale deposition on the inner walls and other surfaces of a polymerization reactor has been attained by coating the surfaces prior to each polymerization run with a compound selected from polar organic compounds such as amines, quinones and aldehydes; and organic dyes and pigments (see U.S. Pat. No. 3,669,946). This method is disadvantageous because of the (1) troublesome drying procedure which must be followed after each coating and (2) lowered productivity of the polymerization reactor as a result of the relatively long period of time spent in the coating process between polymerization runs. In addition, environmental pollution and health problems are caused by the large amounts of organic solvents employed with the coating compounds.

SUMMARY OF THE INVENTION

The object of the present invention is to provide a novel and improved method for the effective prevention of polymer scale deposition on the walls and other surfaces in the polymerization reactor in suspension polymerization of vinyl chloride, which is free from the above-described problems and has a very high production efficiency.

The method of polymerizing vinyl chloride, or a monomer mixture having vinyl chloride as a main component with one or more copolymerizable monomers, in accordance with the present invention, comprises adding to a suitable polymerization mixture at least one additive selected from the group consisting of iodine salts of alkali metals and alkaline earth metals.

The prevention of polymer scale deposition in accordance with the above method can be further enhanced by coating the various surfaces coming into contact with the monomer or monomers with a polar organic compound or an organic dye.

DETAILED DESCRIPTION OF THE PREFERRED EMBODIMENTS

The additives included in the polymerization mixture in accordance with the method of the present invention are selected from iodine salts of alkali metals and alkaline earth metals such as sodium iodide, potassium iodide, calcium iodide, and magnesium iodide. Sodium, calcium, and potassium iodide are most preferred.

The polar organic compounds used for coating the reactor surfaces are organic compounds having one or more atoms or groups of atoms having unpaired electrons in their molecules. Said atoms include oxygen, nitrogen, and sulfur. Illustrative of the polar organic compounds are nitrogen-containing organic compounds selected from those with azo, nitro, nitroso and azomethine groups or azine rings and amine compounds, such as azomethane, azobenzene, nitrobenzene, nitrosobenzene, monoaminomononitroazobenzene, pyrazine, pyridine, thiazines, oxazines (e.g., morpholine), aniline, benzalaniline, ethylenediaminetetraacetic acid, α-naphthylamine, ethanolamine, diethanolamine, triethanolamine, vitamin $B_2$ (i.e., nicotinic acid amide) and chlorophyll; sulfur-containing organic compounds selected from those with thiocarbonyl or mercapto groups or thioether linkage, such as thioglycollic acid, thiourea, thiocarbanillic acid, thiocarbamic acid, thiobenzoic acid, thioethers and mercaptans; oxygen-containing organic compounds selected from quinones, such as p-benzoquinone, ketones, such as aceptophenone and benzophenone, aldehydes, such as acetaldehyde and benzaldehyde, alcohols having more than 5 carbon atoms, such as cetyl alcohol, octyl alcohol and benzyl alcohol, and carboxylic acids having more than 5 carbon atoms, such as stearic acid and naphthoic acids; and aliphatic or alicyclic polyene compounds with conjugated double bonds, such as vitamin $A_1$, vitamin $A_2$ and α-, β- and γ-carotenes.

The organic dyes useful for coating the surfaces of the polymerization reactor are exemplified by methylene blue; nigrosine black; nigrosine base; oil black; spirit black; aniline black; fluorescein; monoazo and polyazo dyes, such as Amaranth; metal-containing azo dyes; naphthol dyes belonging to azoic or inactive azo dyes; dispersed azo dyes; anthraquinone dyes, such as anthraquinone acid dyes, anthraquinone vat dyes, anthrone vat dyes, alizarin dyes, such as alzarin, and dispersed anthraquinone dyes; indigoid dyes, such as Brilliant Indigo B, Threne Red Violet RH and Threne Printing Black B; sulfide dyes, such as sulfur blue FBB and Sulfur Black B; phthalocyanine dyes, such as copper phthalocyanine and metal-free phthalocyanine compounds; diphenylmethane and triphenylmethane dyes; nitro dyes; nitroso dyes, thiazol dyes; xanthene dyes; acridine dyes; azine dyes; oxazine dyes; thiazine dyes; benzoquinone and naphthoquinone dyes; cyanine dyes; and related compounds of organic dyes, such as complexes or mixtures of tars and pitches as well as certain water-soluble organic dyes.

The last-mentioned water-soluble organic dyes include (1) alkali metal salts of sulfonic acids, such as Direct Brilliant Yellow G (direct dye), Acid light Yellow 2G (acid dye), Levafix Yellow 4G (reactive dye), Procion Brilliant Orange G (reactive dye), Direct Fast Scarlet GS (direct dye), Direct Bordeaux NS (direct dye), Brilliant Scarlet 3R (acid dye), Acid Alizarin Red B (acid mordant dye), Direct Turkish Blue GL (direct dye), Cibacron Blue 3G (reactive dye), Blankophor B (acid dye), Nigrosine (acid dye) and Sirius Gray G (direct dye); alkali metal salts of carboxylic acids, such as Chrysamine G (direct dye), Direct Fast Yellow GG (direct dye), Chrome Yellow G (acid mordant dye), Chrome Yellow ME (acid mordant dye) and Eosine G (acid dye); quatenary ammonium salts, such as Basic Flavin 8G (basic dye), Astrazon Yellow 3G (basic dye), Rhodamine 6GCP (basic dye), Safranine T (basic dye), Rhodamine B (basic dye) and Daitophor AN (basic dye); and hydrochlorides, such as Auramine Conc (basic dye), Chrysoidine (basic dye) and Bismarck Brown BG (basic dye).

Among the above-named organic dyes and related compounds the most preferred are nigrosine black, nigrosine base, spirit black and oil black.

In practicing the method of the present invention, the additives can be added as is to the polymerization mixture or, if necessary, as a solution or dispersion in a solvent or a mixture of solvents. The solvents suitable for this purpose are not specifically limited but may be water, alcohols, esters, ketones, hydrocarbons or chlorinated hydrocarbons.

The amount of the additives should be at least 3 p.p.m. by weight based on the weight of monomer or monomers present in the polymerization mixture. Any amount above 5,000 p.p.m. by weight brings about various undesirable effects in the polymerization as well as in the quality of polymer products. Accordingly, it is preferred that the amount of the additives is in the range of between about 3 and 5,000 p.p.m., or preferably between about 10 and 1,000 p.p.m. by weight, based on the weight of monomer or monomers present. The additives are added to the polymerization mixture preferably before the start of the polymerization run. However, it is optional to use them during the course of polymerization.

The coating compounds are dissolved or dispersed in a solvent or a mixture of solvents in advance of applying the polar organic compounds or organic dyes to coat the walls and other reactor surfaces coming into contact with the monomers. The coated surfaces are then dried by air or by hot-air at about 60°-70° C. When two or more coats are made using the same or different coating compounds, hot-air drying is preferably carried out after the application of each coat. The solvents suitable for dissolving or dispersing the organic compounds or dyes are exemplified by ethers, such as tetrahydrofuran and diisopropylether; alcohols, such as methanol, ethanol and propanol; esters, such as methyl acetate and ethyl acetate; ketones, such as acetone and methylethylketone; hydrocarbons, such as benzene, toluene, xylene and hexane; chlorinated hydrocarbons, such as methylene chloride, carbon tetrachloride and trichloroethylene; and aprotic solvents, such as dimethylformamide, dimethylacetamide and dimethylsulfoxide.

The amount of the coating compound applied over the surfaces is at least 0.0001 g, or preferably between about 0.005 and 1.0 g, per square meter of coated area, so that the prevention of polymer scale deposition can be fully attained.

The addition of the additives to the polymerization mixture, without the additional procedure of coating the reactor surfaces, is sufficiently effective in the prevention of polymer scale deposition in most cases. This method is advantageous because there is no possibility of pollution since the surface coating procedures where organic solvents are employed are omitted and, as a result, production efficiency of polyvinyl chloride resin is very much improved, since the time-consuming coating procedure is omitted.

The above effect of preventing polymer scale deposition can be further increased by also coating the various surfaces of the reactor. In this case, the amount of the additives added to the polymerization mixture can be significantly reduced and, once the inner walls and other surfaces of the polymerization reactor have been coated with the coating compounds, an unexpectedly large number of polymerization runs can be continuously performed without polymer scale deposition.

The method of the present invention is effective in the suspension polymerization of vinyl chloride. The method of the present invention does not restrict the addition of other auxiliary additives to the polymerization mixture; they may be polymerization initiators, suspending agents, emulsifiers and, sometimes, chain transfer agents. The method of the invention also does not restrict the temperature of the polymerization reaction and the amount of agitation which can be used. The method of the invention is excellent in the prevention of polymer scale deposition not only in the homopolymerization of vinyl chloride, but also in the copolymerization of vinyl chloride with one or more ethylenically unsaturated monomers copolymerizable with vinyl chloride, such as vinyl esters, vinyl ethers, acrylonitrile, acrylic and methacrylic acids and their esters, maleic acid, aromatic vinyl monomers, vinyl halides other than vinyl chloride, vinylidene halides and olefins.

The following examples are for illustrative purposes only and are not meant to limit the invention as defined by the generic claim. In the examples, p.p.m. are based on the weight of the monomers. A product's heat stability and the number of fish eyes referred to in some examples or in the tables were determined as follows:

Determination of the Heat Stability of a Product.

A mixture of 100 parts by weight of a polyvinyl chloride resin, 1 part by weight of dibutyl tin maleate and 1 part by weight of stearic acid was blended on a roller mixer at 170° C. for 10 minutes, to form a sheet 0.7 mm thick. The sheet was heated in a Geer oven at 180° C., and the time it took to blacken the sheet was recorded in minutes, to denote the heat stability of the polyvinyl chloride resin.

Determination of Fish Eyes.

A mixture of 100 parts by weight of a polyvinyl chloride resin, 50 parts by weight of dioctyl phtalate, 1 part by weight of dibutyl tin dilaurate, 1 part by weight of cetyl alchohol, 0.25 parts by weight ot titanium dioxide and 0.05 parts by weight of carbon black was blended on a roller mixer at 150° C. for 7 minutes, to ultimately form a sheet 0.2 mm thick. The number of fish eyes occurring in the sheet were counted by transmitting light over an area of 100 $cm^2$ of the sheet.

EXAMPLE 1

Into a 1,000-liter stainless stell polymerization reactor equipped with a baffle plate and an agitator having paddle-type blades of 600 mm in a diameter were charged 200 kg of vinyl chloride, 500 kg of deionized water, 200 g of partially saponified polyvinyl alcohol, 60 g of azbisdimethylvaleronitrile and each of the various additives as indicated in Table I in an amount as indicated in the same table. Then, polymerization was conducted at 57° C. for 9 hours. The amount of polymer scale deposited, the particle size distribution of the resulting product, and the number of fish eyes occuring in the product were determined, with the results as set out in the table. The heat stability of the product resin was 120 minutes in all of the experiments from Nos. 1 through 8.

TABLE I

| Exp. No. | Additive | Amount p.p.m. | Scale g/m² | Particle Size Distribution, % * | ** | *** | Fish Eyes |
|---|---|---|---|---|---|---|---|
| 1 | None | — | 1100 | 100 | 78.6 | 2.8 | 66 |
| 2 | Sodium iodide | 100 | 10 | 99.0 | 77.0 | 2.5 | 18 |
| 3 | Sodium iodide | 1000 | 0 | 91.2 | 66.9 | 2.5 | 6 |
| 4 | Sodium iodide | 2000 | 0 | 88.3 | 61.7 | 2.0 | 7 |
| 5 | Calcium iodide | 100 | 5 | 100 | 67.1 | 1.8 | 10 |
| 6 | Calcium iodide | 500 | 0 | 100 | 65.5 | 2.0 | 5 |
| 7 | Calcium iodide | 1000 | 0 | 100 | 69.2 | 2.2 | 8 |
| 8 | Calcium iodide | 2000 | 0 | 100 | 71.8 | 2.2 | 3 |

\* Passing through a 60-mesh screen.
\*\* Passing through a 100-mesh screen.
\*\*\* Passing through a 200-mesh screen.

EXAMPLE 2

8.5 kg of vinyl chloride, 1.5 kg of vinyl acetate, 20 kg of deionized water, 10 g of partially saponified polyvinyl alcohol, 3 g of diisopropylperoxydicarbonate, 200 g of trichloroethylene and each of the additives as indicated in Table II in an amount also shown in the table were charged into a 500-liter glass-lined polymerization reactor. Then, after 15 minutes of preliminary mixing, polymerization was conducted at 58° C. for 12 hours. The amount of polymer scale deposited in each experiment is given in the table. The product resins were found satisfactory with respect to particle size distribution, heat stability and occurrence of fish eyes.

TABLE II

| Exp. No. | Additive | Amount p.p.m. | Scale g/m² |
|---|---|---|---|
| 9 | None | — | 1400 |
| 10 | Potassium iodide | 100 | 6 |

What is claimed is:

1. A method of polymerizing vinyl chloride or a monomer mixture containing vinyl chloride as a main component, in an aqueous suspension in a polymerization reactor, which comprises adding at least one additive selected from the group consisting of iodine salts of alkali metals and alkaline earth metals to a polymerization mixture in said reactor.

2. A method of claim 1, wherein said alkali metals are selected from sodium and potassium and said alkaline earth metal is calcium.

3. The method of claim 1, wherein the amount of said additive is present in the range of between about 3 to 5,000 p.p.m. by weight based on the weight of said vinyl chloride or monomer mixture in said polymerization mixture.

4. The method of claim 1, wherein said additive is added to said polymerization mixture prior to the initiation of polymerization.

5. The method as claimed in claim 1, wherein the surfaces of said polymerization reactor coming into contact with the monomer are coated with at least one member selected from the group consisting of polar organic compounds and organic dyes.

6. The method of claim 5, wherein the coating is in an amount ranging from 0.005 to 1.0 g per square meter of coated surface.

7. The method of claim 5, wherein said polar organic compound is selected from the group consisting of vitamin $B_2$, $\beta$-carotene and chlorophyll.

8. The method of claim 5, wherein said organic dye is selected from the group consisting of alizarin, nigrosine base, methylene blue, fluorescein and Amaranth.

9. The method of claim 1, wherein said iodine salts are selected from the group consisting of sodium iodide, potassium iodide, and calcium iodide.

* * * * *